United States Patent [19]

Gentilini

[11] 3,831,302

[45] Aug. 27, 1974

[54] ILLUMINATION DEVICE WITH GLITTERING EFFECT FOR ADVERTIZING AND DECORATIVE PURPOSES

[76] Inventor: Augusto Gentilini, 36 Via dei Mille, Rome, Italy

[22] Filed: July 25, 1972

[21] Appl. No.: 274,889

[30] Foreign Application Priority Data
July 29, 1971    Italy................................. 51985/71

[52] U.S. Cl.............. 40/106.52, 40/132 F, 240/10.1
[51] Int. Cl............................................ G09f 13/36
[58] Field of Search .....................................
    40/106.51–106.54, 77, 133 A, 132 F; 240/10.1

[56] References Cited
UNITED STATES PATENTS

| | | | |
|---|---|---|---|
| 2,583,055 | 1/1952 | Kress et al........................ | 40/132 F |
| 2,904,913 | 9/1959 | Derringer........................ | 40/132 F |
| 2,963,807 | 12/1960 | Relph et al. ..................... | 40/106.53 |
| 3,119,565 | 1/1964 | Nottingham ................. | 40/106.53 X |
| 3,399,476 | 9/1968 | Davis ............................... | 40/130 K |
| 3,699,697 | 10/1972 | Painton........................... | 40/106.53 |

OTHER PUBLICATIONS
3,526,984 09001970 Nielsen et al. 40 106.52

*Primary Examiner*—Robert W. Michell
*Assistant Examiner*—John F. Pitrelli
*Attorney, Agent, or Firm*—McGlew and Tuttle

[57] ABSTRACT

An illumination device comprises a housing having a front viewing wall of transparent or semi-transparent material and having an interior wall with a reflective surface behind a light source. A rotatable member is mounted adjacent to the light source and it includes a plurality of radially extending light deviating members such as metallic laminar, which receives light from the light source and reflects at least a portion thereof to the front face of the device. A screen is mounted between the light source and the rotatable member and it is oscillated backwardly and forwardly by the same motor which drives the rotatable member in order to produce various lighting effects on the rotatable light deviating members and the front viewing wall.

9 Claims, 5 Drawing Figures

ILLUMINATION DEVICE WITH GLITTERING EFFECT FOR ADVERTIZING AND DECORATIVE PURPOSES

FIELD AND BACKGROUND OF THE INVENTION

This invention relates in general to the construction of lighting devices or luminaires and, in particular, to a new and useful illumination device or advertising device which includes a front viewing panel which receives light from a light source in a housing which is reflected off radially extending elements of a rotatable member under the varying influence of a screen which is interposed between the light source and the member.

DESCRIPTION OF THE PRIOR ART

At present there are illumination devices with lighting effects variable in intensity, form and color, suitable for theater halls or similar uses, but they are complex and costly. There are also luminous signs with variable lighting effected by means of lamps which light up one after the other.

Glittering luminous signs have been created by means of mobile mirror elements, but the cost was always too high and the lifetime too short because of the necessity to continuously exchange the lamps and the reflecting elements.

The invention provides an improved illumination device which includes means for achieving a luminous glitter effect particularly on a front viewing face of a lighting fixture. The fixture of the invention includes a rotatable member having a plurality of radially extending thin metallic members or threads which receive light from a light source mounted within the housing. In the preferred form, a screen is mounted between the light source and the rotatable member and it is oscillated to vary the light angle in the direction of the light rays from the light source which reflect from the rotatable member and appear in the front viewing wall of the device.

Accordingly, it is an object of the invention to provide an improved illumination device such as an advertising sign or the like which includes a front viewing panel with a light source within the housing behind the panel which throws rays through an oscillating screen onto a rotatable member having a plurality of radially extending light deviating members so as to produce a luminous glitter effect on the viewing panel.

A further object of the invention is to provide an illumination device or luminaire which is rugged in construction, simple in design and economical to manufacture.

For an understanding of the principles of the invention, reference is made to the following description of typical embodiments thereof as illustrated in the accompanying drawings.

GENERAL DESCRIPTION OF PREFERRED EMBODIMENTS

Figure 1:
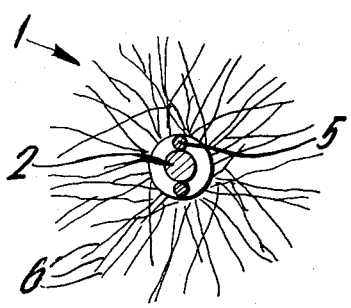
FIG. 1 is a transverse sectional view of a rotatable light deviating member constructed in accordance with the invention.
Figure 2:
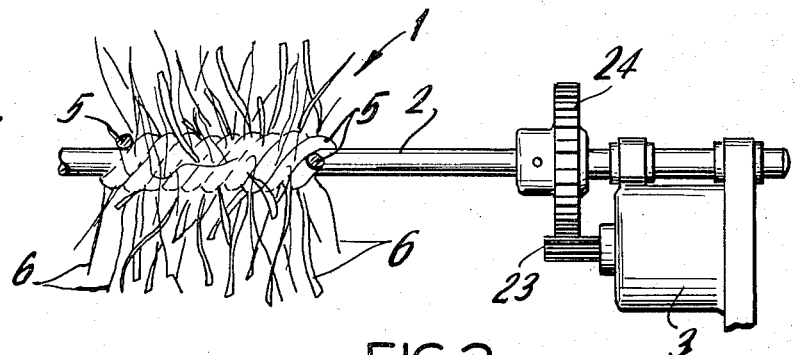
FIG. 2 is an end elevational view partly broken away of the apparatus for rotating the light deviating member.
Figure 3:
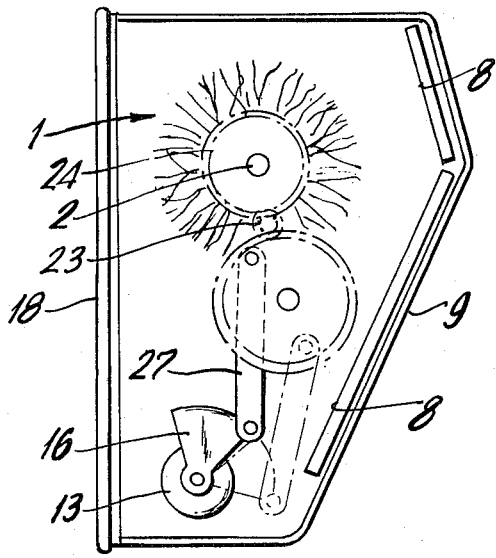
FIG. 3 is a transverse sectional view partly in elevation, of a luminaire construction in accordance with the invention.
Figure 4:
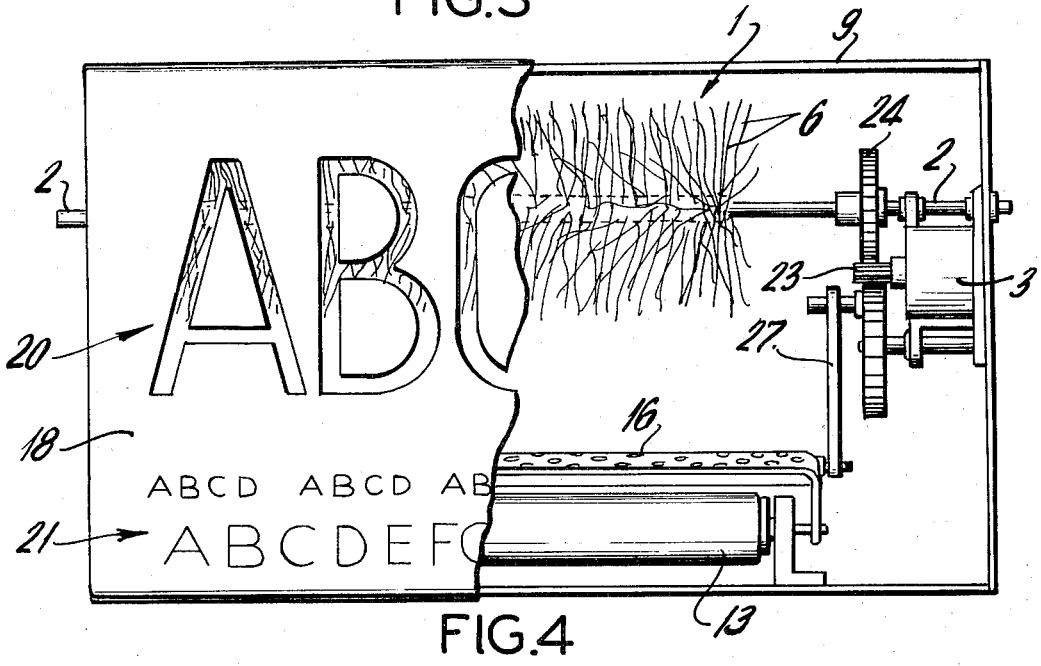
FIG. 4 is a front elevational view with a part of the front cover broken away, of the luminaire shown in FIG. 3.

The apparatus according to the invention is formed by a rotating body, generally designated 1, constituted by a solid pin 2 which is driven by a motor 3. The pin 2 is covered by helicoidal threads 5 and thin metallized laminae or threads 6 of various width, thickness and color according to the dimension of the device and the effect which is to be obtained. The rotating body 1 is kept in a container 9 covered on its interior rear wall with chromium on its inner surface, or at any rate, made reflecting or fitted inside with reflecting surfaces, such as mirrors 8 or metallic or metallized laminae construction. Inside the container 9 adjacent a front wall or display face 18 is also a lamp 13. An adjustable screen 16 having perforations of select size and shape is preferably also colored. The display face 18 of the apparatus, if used for advertising, carries the inscription which can be subdivided between a main upper part 20 having at least a transparent letter portion with glittering effects and a smaller lower part 21, illuminated directly by the lamp 13 and, therefore, with fixed light.

A drive motor 3 with a pinion reducer 23 and toothed wheel 24 are mounted inside of the container 9, as illustrated, or on the outside, if desired. Several apparatus, one adjacent to the other, can be driven by a single motor, as the shafts 2 can be linked with each other. A connection 27 between the motor and the screen 16 is used to produce an oscillation of the screen 16 and further periodic variations in color and light and in the glittering effect. The form of the container 9 is illustrated in the figure, as an example only, but other forms can be adopted according to desire in order to obtain various luminous effects. The screen 16 oscillates between the solid line position and dotted line position shown so that it periodically covers the top and rear side of the light but leaves the front portion free to continuously illuminate the lower area 21 of the display face 18.

Figure 5:
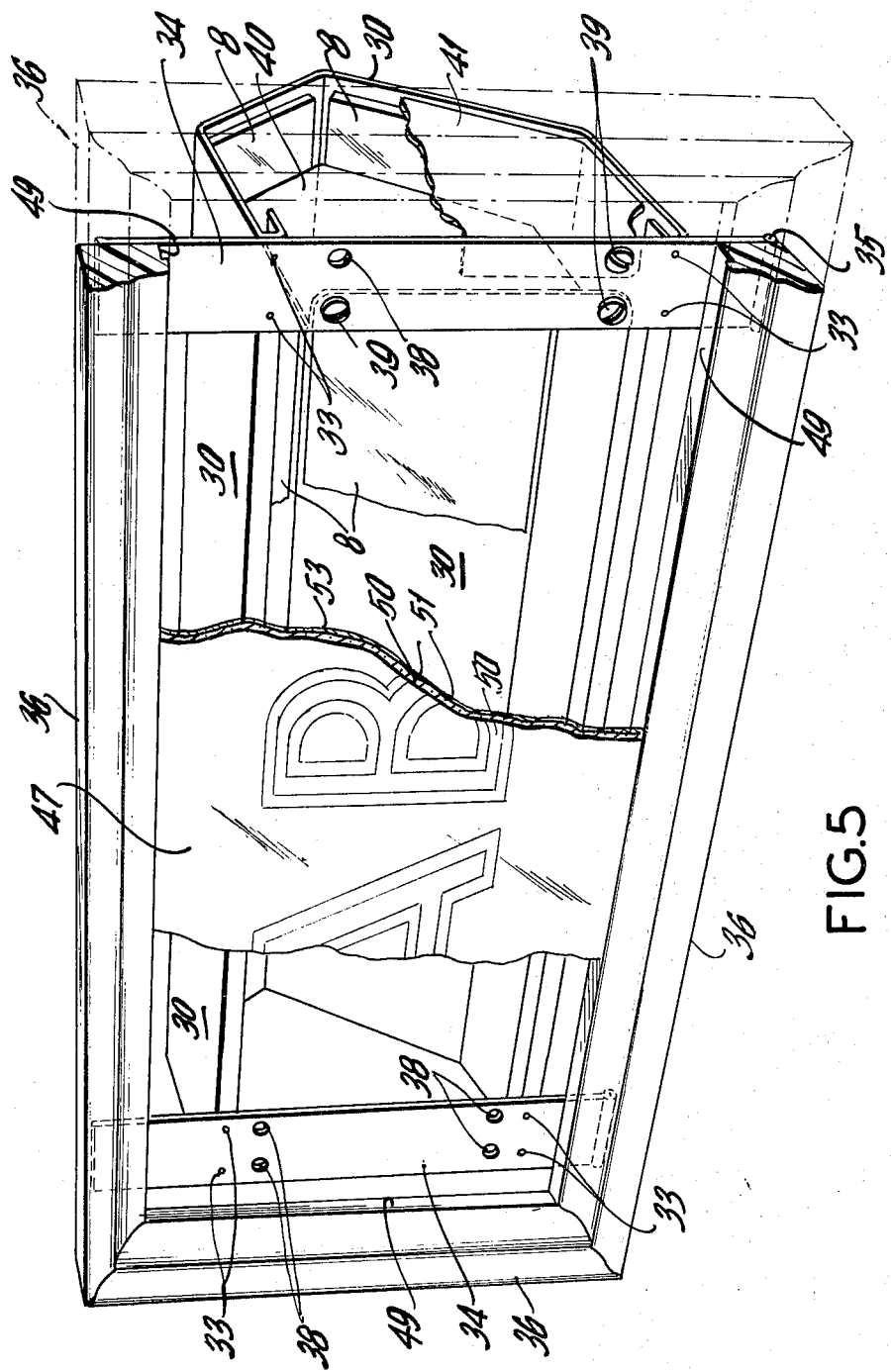
FIG. 5 is a front, side perspective view partly in section of another embodiment of the invention.

The device shown in FIG. 5 is placed in the container formed by a bent back lamina 30 fastened such as by welding 33 to the cross bars 34 in which hinges 35 are anchored keeps the frame formed thereby in such a way that it can easily be opened. For this purpose the cross bars are fitted with holes 38 for the passage of screws 39 to fix the lateral parts 40 and 41 which are not only intended to close the apparatus but also to keep it in place with the necessary clearance for the mirrors 8 on the rear wall. The motor 3 and the various components of the electric installation are also mounted within the frame. The lateral walls 40 and 41 also reflect towards the inner part of the apparatus in order to obtain the effect of multiplying the glittering effect from lateral viewpoints. The frame 36 is fitted with pawls or similar devices (not represented) to keep the front glass 47 in its normal seat 49 and to easily effects its exchange. The inscription may be formed either by transparent letters 50 mounted over openings of the surface 53 and/or incisions 41 in the surface 53 which is made of a non-transparent material. The inscription is applied to the back surface of the outer glass 47 or to the front surface of another inner glass (not represented) in contact with glass 47.

In accordance with this embodiment, in order to improve the glittering effect, the fluorescent light 13 can advantageously be replaced by a series of incandescent lamps (preferably of the type called "olive-shaped") with a not frosted but transparent glass having ventilation apertures to avoid excessive heat, or by arranging lamps side by side along with the fluorescent lamps. In order to obtain the most varied effects, a rotating switch is connected with the motor 3 which drives the rotating body 1.

I claim:

1. An illumination device comprising a housing having a reflective wall and an opposite viewing wall with a fixed viewing portion, a rotatable member carried in said housing behind said viewing wall having a plurality of light deviating strands extending outwardly therefrom, means for rotating said member, a light source below said rotatable member constantly illuminating at least a portion of said viewing wall, the space between said light source and said fixed wall portion being unobstructed so that light from said light source constantly falls on said fixed viewing portion, a movable screen over said light source and below said rotatable member periodically movable in a path between a position above said light source to a position to the rear of said light source, said screen controlling the light transmitted from said light source to the light deviating members for producing a luminous glitter effect on said viewing wall and means for moving said screen and for rotating said rotatable member.

2. A device according to claim 1, wherein said reflective wall means comprises a mirror.

3. An illumination device according to claim 1, wherein said housing includes a trough shaped member having a reflective surface comprising said reflective wall, a pair of longitudinally spaced substantially vertical upright members carried adjacent said viewing wall in said housing and supporting said trough member with the open end facing toward said viewing wall.

4. A device according to claim 3 including a frame at the front of said housing and surrounding said viewing wall and defining a receiving channel for a transparent viewing member.

5. An illumination device according to claim 1, wherein said viewing member includes a transparent glass panel and an interior layer with incisions defining a legend on said panel.

6. An illumination device according to claim 1, wherein said housing includes a lower wall, means supporting said light source on said lower wall at a spaced location therefrom, said screen being rotatably mounted for rotation about an axis substantially parallel to the axis of said light source, said means for rotating said rotatable member comprising a drive member, and gear means connected between said drive motor said rotatable member and said drive motor and said screen for rotating said rotatable member and for oscillating said screen.

7. An apparatus according to claim 1, wherein said light source comprises at least one lamp.

8. An illumination device comprising a housing having a viewing wall, a rotatable member carried in said housing behind said viewing wall having a plurality of light deviating members extending outwardly therefrom, means for rotating said member, a light source adjacent said rotatable member, and screen means between said light source and said rotatable member for controlling the light transmitted from said light source to the light deviating members for producing a luminous glitter effect on said viewing wall, said screen comprising a perforated member having varying colors, said means for rotating said member being connected to said screen for oscillating said screen, said viewing wall carrying a legend including a fixed portion with an inscription, said light source being located adjacent said fixed portion and constantly illuminating said fixed portion without being blocked by said screen.

9. An illumination device, comprising a housing with a rear wall having reflections means and an opposite front wall defining a display face with at least a portion being transparent at a first location adjacent the bottom and a further portion being transparent at a second location above the bottom, means defining a light source within said housing extending across the lower portion thereof, a relatively thin screen extending across said housing overlaying a portion of said light source, means mounting said screen for oscillation between positions in which said screen overlies said light source to in which said screen is located to the rear of said light source, said screen having a pattern of openings permitting light from said light source to pass through the openings, a rotatable member extending across said housing above said light source and in alignment with said second location of said display face and having a plurality of generally radially extending fibers projecting outwardly therefrom at least some of which are reflective and which both block and reflect light from said light source and from said reflection means, means to rotate said rotatable member and to oscillate said screen, said light source continuously lighting said first location and cyclically directing light through the openings of said screen to said rotatable member and to said reflection means and also directly to said rotation member and said reflection means.

* * * * *